United States Patent
Ihlar et al.

(10) Patent No.: US 11,304,245 B2
(45) Date of Patent: Apr. 12, 2022

(54) METHOD AND DEVICE PROXY FOR HANDLING RADIO COMMUNICATION OF DATA TO A WIRELESS DEVICE

(71) Applicant: Telefonaktiebolaget LM Ericsson (publ), Stockholm (SE)

(72) Inventors: Marcus Ihlar, Älvsjö (SE); Robert Skog, Hässelby (SE); Ala Nazari, Handen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/763,511

(22) PCT Filed: Nov. 13, 2017

(86) PCT No.: PCT/EP2017/079045
§ 371 (c)(1),
(2) Date: May 12, 2020

(87) PCT Pub. No.: WO2019/091582
PCT Pub. Date: May 16, 2019

(65) Prior Publication Data
US 2020/0329515 A1   Oct. 15, 2020

(51) Int. Cl.
*H04W 76/15* (2018.01)
*H04W 76/12* (2018.01)
(Continued)

(52) U.S. Cl.
CPC ......... *H04W 76/12* (2018.02); *H04L 65/4069* (2013.01); *H04W 28/0268* (2013.01); *H04W 76/15* (2018.02); *H04W 88/06* (2013.01)

(58) Field of Classification Search
CPC . H04W 76/12; H04W 76/15; H04W 28/0268; H04W 88/06; H04W 80/00;
(Continued)

(56) References Cited

U.S. PATENT DOCUMENTS

2006/0293040 A1   12/2006   Kortge
2012/0124196 A1*  5/2012    Brisebois .......... H04W 52/0258
                                                         709/224
(Continued)

FOREIGN PATENT DOCUMENTS

EP   2259651 A1   12/2010

OTHER PUBLICATIONS

International Search Report and Written Opinion for International Patent Application No. PCT/EP2017/079045, dated Jul. 4, 2018, 13 pages.

Primary Examiner — Lakeram Jangbahadur
(74) Attorney, Agent, or Firm — Withrow & Terranova, PLLC (57) ABSTRACT

A method and a device proxy for handling radio communication of content data from a data source to be played out on a media player of a wireless device in a wireless network. When detecting that a potential data class is available, the device proxy fetches segments of the content data from the data source over a potential data bearer dedicated for data of said potential data class. The potential data bearer is dedicated for data of the potential data class, which is less sensitive to delay than data of other data classes. The potential data bearer is also less costly to use compared to other data bearer(s). The fetched segments of content data are stored by the device proxy in an intermediate buffer, and the segments of content data are delivered from the intermediate buffer when requested by the media player.

17 Claims, 5 Drawing Sheets

(51) Int. Cl.
*H04L 65/61* (2022.01)
*H04W 28/02* (2009.01)
*H04W 88/06* (2009.01)

(58) Field of Classification Search
CPC . H04W 76/10; H04W 76/14; H04W 28/0278; H04W 88/04; H04L 65/4069; H04L 65/60
See application file for complete search history.

(56) References Cited

U.S. PATENT DOCUMENTS

| 2013/0286838 A1* | 10/2013 | Zakrzewski | H04W 28/0215 |
| | | | 370/235 |
| 2014/0136658 A1* | 5/2014 | Wahler | H04B 7/18506 |
| | | | 709/218 |
| 2017/0244474 A1* | 8/2017 | Ijaz | H04B 7/2606 |
| 2018/0219789 A1* | 8/2018 | Chaudhuri | H04L 47/32 |

* cited by examiner

METHOD AND DEVICE PROXY FOR HANDLING RADIO COMMUNICATION OF DATA TO A WIRELESS DEVICE

This application is a 35 U.S.C. § 371 national phase filing of International Application No. PCT/EP2017/079045, filed Nov. 13, 2017, the disclosure of which is incorporated herein by reference in its entirety.

TECHNICAL FIELD

The present disclosure relates generally to a method and a device proxy, for handling radio communication of data to a wireless device in a wireless network.

BACKGROUND

In a wireless network, the amount of available radio resources in terms of frequency spectrum and transmission time is typically limited and it is therefore desirable to utilize the radio resources available, e.g. in a cell or other area, as efficiently as possible so as to achieve high capacity and adequate performance in communication with wireless devices. For example, by reducing the amount of "unnecessary" resource consumption for a particular communication, the amount of free resources that can be used for other communications can be increased. It is often also desirable to reduce power consumption in battery powered wireless devices so as to minimize the need for charging their batteries.

The term "wireless network" is used in this description to denote any network comprising network nodes, such as base stations, access points, eNodeBs or the like, which are capable of radio communication with wireless devices over a radio interface. Without limitation, the wireless network discussed herein may be a cellular network e.g. a 5G wireless network or a WiFi network. Depending on the type of network and terminology used, a network node may be referred to as a base station, radio node, E-UTRAN Node B, eNB, 5G node, base transceiver station, access point, etc. In this disclosure, the term "network node" is used without limitation to any particular type of wireless network.

Further, the term "wireless device" is used herein to represent a wireless communications device which could be any communication equipment that is capable of radio communication with a wireless network by sending and receiving radio signals to/from a network node of the wireless network. The wireless devices discussed herein may, without limitation, include mobile telephones, smartphones, tablets, laptop computers, Machine-to-Machine, M2M, devices, also known as Machine Type Communication, MTC, devices, and so forth. Another commonly used generic term in this field is "User Equipment, UE" which could be used herein as a synonym for wireless device.

Figure 1:
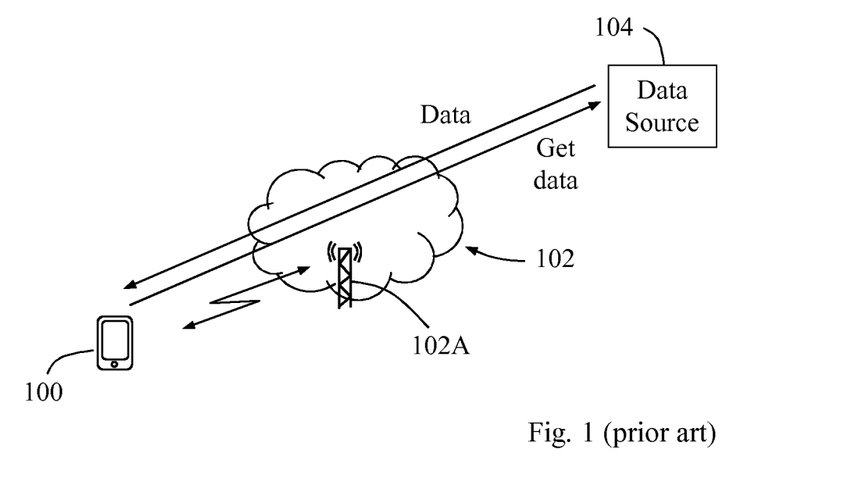
FIG. 1 is a communication scenario illustrating how video content is downloaded to a wireless device, according to the prior art.

In this description, it is assumed that the wireless device has a media player or the like which is capable of playing out content data, such as any video and/or audio content, that is received or downloaded from a data source such as a content server or similar. A "data source" is thus a node that delivers content data to the wireless device, such as a content server or the like. In this description, it is assumed that the data is delivered in segments such as video segments, although other terminology may also be applicable depending on implementation. The segments are typically requested and fetched from the data source one by one, which is schematically illustrated in FIG. 1 as follows.

In this scenario, a wireless device 100 is wirelessly connected to a wireless network 102 over a serving network node 102A and a video session has been established with a data source 104 over the network 102. The wireless device 100 thus repeatedly sends a request for a next video segment, as illustrated by a message "Get data", to the data source 104 which responds by returning the requested video segment, "Data", to the wireless device 100. The received video segments are first stored in a playout buffer, not shown, from which the "oldest" segment is played out in sequence on a media player at the wireless device 100.

It was mentioned above that it is desirable to utilize the available radio resources in a cell or the like efficiently. Another challenge is to make sure that content data sent from a data source towards a wireless device for playout arrives "in time" so that there are no disturbing delays or even missing data in the playout operation. Some data is more delay-sensitive than other data, meaning that the delay-sensitive data must arrive and be played out before a certain deadline after which the data is considered to be more or less useless or the quality of using the data has become too low.

There are solutions where wireless device users can have different priorities so that data to a high priority user takes precedence in the network over data to a low priority user, to ensure high quality in the playout for the high priority user. High priority users may also have to pay a higher fee per transmitted bit than low priority users, and the cost for transmitting a certain amount of data in terms of utilized radio resources can be higher for the high priority users than for the low priority users.

However, it could be a problem that transmission of data may be associated with varying network cost per transmitted data bit for one and the same user, which cost is greatly dependent on the current radio conditions for the user's wireless device. This network cost is basically independent of how important it is to get the data across to the receiver in time. As a result, data of less importance may well be equally or even more costly for the network to communicate than data of higher importance.

In this context, the term "cost" refers to how much radio resources are used in a cell or similar, and also to the amount of transmission power needed to reach the wireless device. In more detail, if the radio conditions and resulting signal quality are "poor", e.g. due to the wireless device being located far from the transmitting or receiving network node, higher transmission power is needed which generates interference in the cell. Typically, also more coding bits per data bit are needed to ensure correct decoding of received data at the wireless device. On the other hand, if the radio conditions are "good", such as when the wireless device is close to the network node, considerably lower transmission power and less coding bits would be sufficient for successful reception and decoding, resulting in lower network cost per transmitted data bit.

Another factor that could impact the network cost per transmitted data bit is availability of bandwidth such that this cost is deemed to be high when the availability of bandwidth is low, and vice versa. Yet another factor that also may impact the network cost per transmitted data bit is the current traffic load wherein the cost is typically higher at high traffic load than at lower traffic load.

In conclusion, it is thus a problem to utilize the available network resources as efficiently as possible and at low cost when content data is transmitted over radio to a wireless device, and still achieve good or at least adequate quality when the content data is played out on the wireless device.

SUMMARY

It is an object of embodiments described herein to address at least some of the problems and issues outlined above. It is possible to achieve this object and others by using a method and a device proxy as defined in the attached independent claims.

According to one aspect, a method is performed by a device proxy associated with a wireless device in a wireless network, for handling radio communication of content data from a data source to be played out on a media player of the wireless device. In this method, the device proxy detects that a potential data class is available for radio communication to the device proxy on behalf of the wireless device, the potential data class indicating that a certain delay for delivering data can be tolerated. The device proxy further fetches segments of the content data from the data source over a potential data bearer dedicated for data of said potential data class, and stores the fetched segments of content data in an intermediate buffer. The device proxy then delivers the segments of content data from the intermediate buffer when requested by the media player.

According to another aspect, a device proxy is associated with a wireless device in a wireless network and arranged to handle radio communication of content data from a data source to be played out on a media player of the wireless device. The device proxy is configured to detect that a potential data class is available for radio communication to the device proxy on behalf of the wireless device, the potential data class indicating that a certain delay for delivering data can be tolerated. The device proxy is also configured to fetch segments of the content data from the data source over a potential data bearer dedicated for data of said potential data class, and to store the fetched segments of content data in an intermediate buffer. The device proxy is further configured to deliver the segments of content data from the intermediate buffer when requested by the media player.

The above method and device proxy may be configured and implemented according to different optional embodiments to accomplish further features and benefits, to be described below.

A computer program is also provided comprising instructions which, when executed on at least one processor in the device proxy, cause the at least one processor to carry out the respective methods described above. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable efficient and low-cost communication of data over a wireless network when the data is sent from a data source to a wireless device, to be played out on a media player which could be integrated with the wireless device or connected thereto. For example, the wireless device can be used for receiving the data over the wireless network and the data is then temporarily stored in a playout buffer waiting to be played out on the media player, basically in the manner described above. In this solution, it has been recognized that efficiency and low cost can be achieved in the network by communicating data over a specific radio bearer, herein referred to as a "potential data bearer", which is sometimes available for communication. Some features and characteristics of the potential data bearer will first be explained as follows.

Efficient use of radio resources can be accomplished by using the above-mentioned potential data bearer which is basically dedicated for communicating data that can be classified as not being delay sensitive, referred to as a "potential data class", which implies that a certain delay for delivering the data can be tolerated. There may also be other types of data bearers available for communicating more delay-sensitive data, such as a real-time bearer for data with highest priority and a semi-real time bearer for data with medium priority that is higher than for the potential data bearer which has the lowest priority of the above-mentioned three bearers. This way, data traffic to or from a specific wireless device can be separated based on the data's delay-sensitivity and be transmitted on different respective data bearers.

For example, the current availability of the potential data class/bearer to the wireless device in a cell may be dependent on whether a cost related parameter associated with the wireless device fulfils a threshold condition or not. The cost related parameter can be determined, e.g. based on measurements, and basically indicates the above-mentioned network cost per transmitted data bit. A cost related parameter and associated network cost may be dependent on e.g. the current radio conditions, the current load in the cell, the current amount of free bandwidth or radio resources, the transmit power needed for the transmission and its resulting interference in the present cell and in other neighboring cells, to mention a few non-limiting examples. Such network costs are recognized as such and have been described and explained above in the background section.

The threshold condition may dictate that the potential data bearer is deemed available when one or more cost related parameters is/are above or below some predefined threshold value(s). Evaluating the threshold condition may further comprise calculating some combined or aggregated value using one or more cost related parameters as input to a predefined algorithm, which value is then compared to a predefined threshold value for determination of the potential data bearer's availability. The use of a threshold condition for determining availability of the potential data bearer is however somewhat outside the scope of this solution and it is basically sufficient herein to detect that the potential data bearer is either available or not available, which may be signaled or otherwise indicated from the network in a suitable manner.

When the cost related parameter fulfils the threshold condition and the potential data bearer is noted to be available in the cell, any data of the potential data class can be wirelessly communicated to or from the wireless device over the potential data bearer. But when the potential data bearer is not available, e.g. due to high traffic load, lack of free bandwidth/resources, poor radio conditions, etc., any data of the potential data class may be communicated over another data bearer that could be chiefly intended for real time or semi-real time data that is more sensitive to delay than data of the potential data class. Alternatively, transmission of data of the potential data class may be postponed until the potential data bearer becomes available as long as the data can tolerate such a delay.

The solution and various embodiments thereof will be described herein in terms of functionality in a novel entity which will be denoted "device proxy" in the following description. The device proxy operates to fetch or download data on behalf of the media player in the wireless device, either over the potential data bearer when available or over some other non-potential data bearer when the potential data bearer is not available. The device proxy stores the fetched data in an intermediate buffer and delivers the data from the intermediate buffer when requested by the media player. In this solution, as long as the potential data bearer is available the device proxy is able to fetch and pre-store several segments of data even before it is requested by the media player, that is in a proactive manner.

Figure 2:
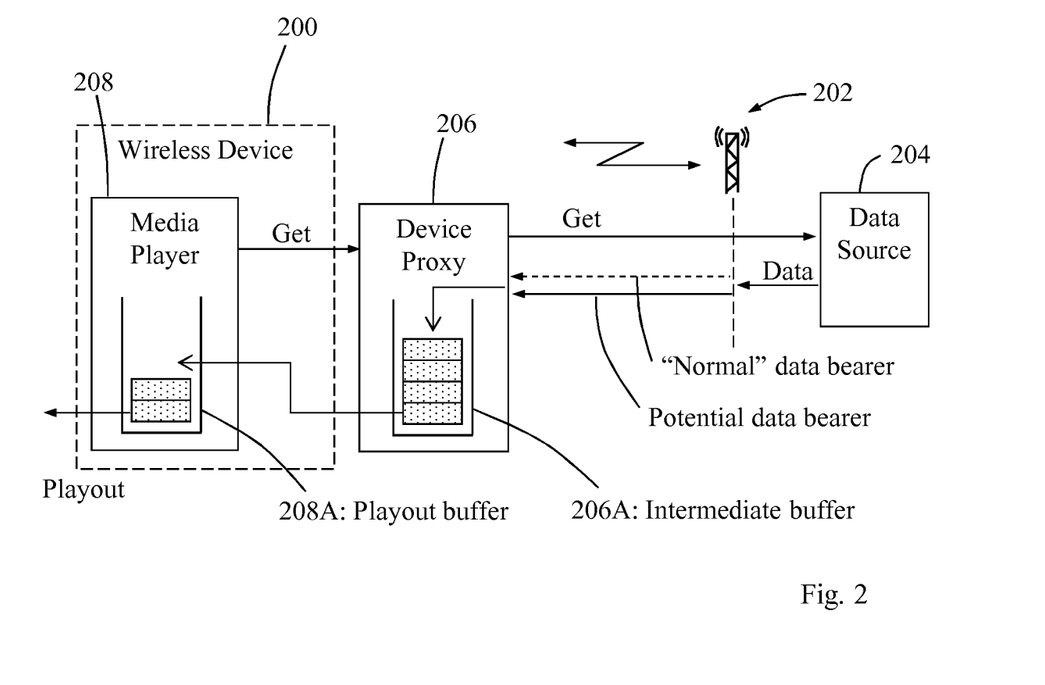
FIG. 2 is a communication scenario illustrating an example where a device proxy is employed for handling radio communication of content data, according to some example embodiments.

An example of how such a device proxy may be employed for handling radio communication of content data will now be described with reference to the communication scenario illustrated in FIG. 2, involving a wireless device 200 being served by a network node 202 of a wireless network, a data source 204 from which content data is fetched/downloaded, the device proxy 206 and a media player 208 residing in the wireless device 200. In this example, the device proxy 206 is illustrated as an entity outside the wireless device 200, for example when the device proxy 206 is implemented in a home gateway or the like to which the wireless device 200 is connected, for communication over a public wireless network that comprises the shown network node 202. Alternatively, the device proxy 206 may be implemented in the wireless device 200 itself, and the embodiments and examples described herein are not limited to either of the above implementations of the device proxy 206.

The device proxy 206 is capable of radio communication with the network node 202 either over the potential data bearer when available, as indicated by a full arrow, or over a non-potential or "normal" data bearer when the potential data bearer is not available, as indicated by a dashed arrow. The data can be communicated selectively in this manner via the network node 202 over the two types of bearers by classification of the data which is thus marked by the data source basically with either potential data class or non-potential data class. When arriving at the network node 202, data of the potential data class will be transmitted over the potential data bearer when available. If not available, this data can be either postponed until the potential data bearer becomes available, or communicated over the non-potential (normal) data bearer. In this context, the non-potential data bearer may include the above-mentioned real-time and semi-real time bearers although the solution is not limited by this terminology.

When the media player 208 is activated by a user to play e.g. some video content that can be delivered by the data source 204, the media player 208 sends a request "Get" through the device proxy 206 requesting for a segment of data of the video content. The data segments described herein may, without limitation, include Video On Demand, VOD, segments and/or Time Shift segments. The device proxy 206 then sends the Get request with an added query parameter to the data source 204 which then accordingly returns the requested data segment towards the device proxy 206. The query parameter added to the request indicates that the requested data segment can be classified by the data source 204 as potential data class, such that the network node 202 can recognize the query parameter and transmit this data segment over the potential data bearer if it is available.

When data segments sent from the data source 204 arrive at the device proxy 206 in radio communication with the network node 202, they are stored and queued in an intermediate buffer 206A therein such that the latest arriving segment is stored last in the queue, as shown by an arrow to the top of the intermediate buffer 206A. Whenever the media player 208 sends a Get request through the data source 204, the "oldest" data segment in the intermediate buffer 206A is delivered, as shown by an arrow from the bottom of the intermediate buffer 206A. The delivered data segment is then placed last in a playout buffer 208A at the media player 208, as shown by the arrow from the bottom of the intermediate buffer 206A to the top of playout buffer 208A. The intermediate buffer 206A is effectively a memory space where fetched data segments can be stored.

According to regular media player procedures, the "oldest" data segment in the playout buffer 208A is played out, and the media player 208 requests for further data segments when the playout buffer 208A needs to be filled but waits if the playout buffer 208A is already full or nearly full. Thereby, the playout buffer 208A can be kept in balance by receiving data segments basically at the same rate as they are played out. On the other hand, the device proxy 206 can proactively fetch data segments as much as possible as long as the potential data bearer is available, that is until its buffer 206A is filled or until there are no more data segments to fetch.

As said above, the device proxy 206 can fetch future data segments over the potential data bearer in advance, i.e. before they are requested by the media player 208, and fill its buffer 206A whenever the potential data bearer is available, thereby utilizing the less costly potential data bearer as much as possible. It is an advantage that the network cost for the communication can be minimized since the more costly non-potential data bearer(s) is consequently avoided as far as possible, while the media player 208 can operate in a normal manner and needs no adaptation to the solution. The device proxy 206 is thus "transparent" to the media player 208. It is another advantage that through the intermediate buffer 206A the device proxy 206 can deliver data segments at a rate requested by the media player 208 regardless of the rate of fetching them from the data source 204, more or less, and that the utilization of the less costly potential data bearer is handled by the device proxy 206.

Figure 3:
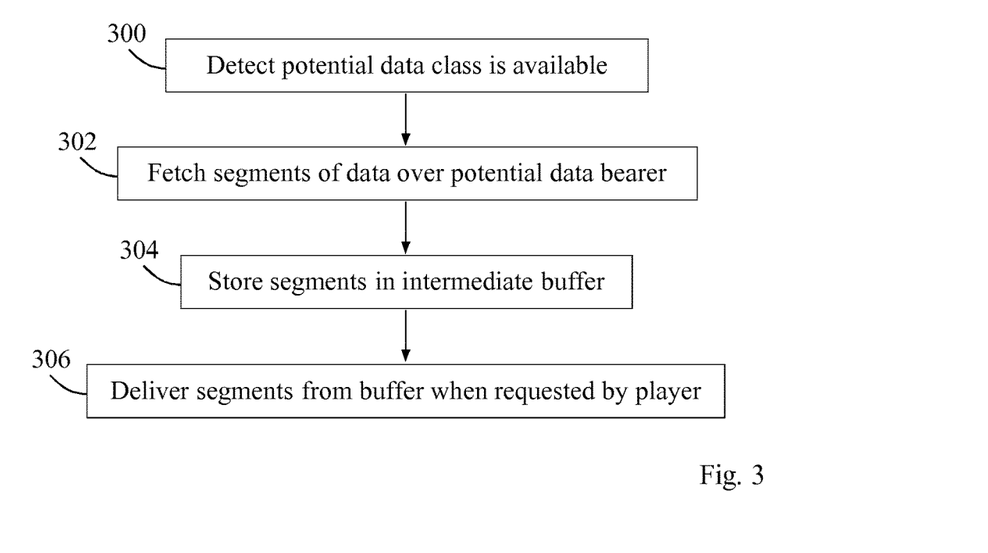
FIG. 3 is a flow chart illustrating a procedure in a device proxy, according to further example embodiments.

An example will now be described with reference to the flow chart in FIG. 3, of how the solution may be employed in terms of actions performed by a device proxy such as the above-described device proxy 206. FIG. 3 is described below with further reference to FIG. 2 although without limitation to such a communication scenario. Some optional example embodiments that could be used in this procedure will also be described below.

The actions shown in FIG. 3 are thus performed by a device proxy 206 associated with a wireless device 200 in a wireless network, for handling radio communication of content data from a data source 204 to be played out on a media player 208 of the wireless device 200. It is assumed that the device proxy 206 is capable of radio communication and is currently connected to and served by a network node 202 of the wireless network.

A first action 300 illustrates that the device proxy 206 detects that a potential data class is available for radio communication to the device proxy 206 on behalf of the wireless device 200, the potential data class indicating that a certain delay for delivering data can be tolerated. Availability of the potential data class may be detected by signalling from the network, e.g. by receiving a suitable control message sent by the network node 202 to the device proxy 206 indicating whether the potential data class is available or not. This availability may be indicated by the network in a one bit indicator such that "1" indicates available and "0" indicates not available, or vice versa.

As said above, availability of the potential data class is typically dependent on the radio conditions experienced by the device proxy 206, which are the same as for the wireless device 200 when they are co-located but when the device proxy 206 is implemented at another location, e.g. in a home gateway, they may experience different radio conditions. Therefore, when saying the potential data class is available for radio communication to the device proxy 206 "on behalf of the wireless device 200", it means that data segments can be communicated from the network node 202 to the device proxy 206 over the potential data bearer, to be played out at the wireless device 200, whether they are co-located or not.

In a next action 302, the device proxy 206 fetches segments of the content data from the data source over a potential data bearer dedicated for data of said potential data class, e.g. by sending Get requests which the above-described query parameter added to the data source 204. When receiving the requested segments over the potential data bearer, another action 304 illustrates that the device proxy 206 stores the fetched segments of content data in an intermediate buffer 206A. Finally, the device proxy 206 delivers the segments of content data from the intermediate buffer 206A when requested by the media player 208, in an action 306.

Some optional example embodiments that could be used in this procedure will now be described. In one example embodiment, segments of the content data may be fetched from the data source over the potential data bearer in action 302 by sending data requests to the data source with a query parameter indicating that requested content data can be classified as potential data class. The query parameter has also been described above.

In further example embodiments, further segments of the content data may be fetched over the potential data bearer until any of the following occurs:

A) The potential data class becomes unavailable. If this happens, data segments could be fetched over a non-potential data bearer, e.g. if the intermediate buffer 206A threatens to soon become empty, or the fetching of potential data bearer could be postponed until the potential data class becomes available again.

B) All accessible segments have been fetched, which may occur when the complete video content has been received or when the data source is unable to send any further data segments, for whatever reason.

C) The intermediate buffer 206A is full, i.e. there is no more free memory space left at the device proxy 206 for storing data segments. In this case, there is no point in fetching further segments since they cannot be stored anywhere.

In general, it is possible to fetch only a certain range of a data segment which is thus less than the complete data segment. In another example embodiment, it may happen that the device proxy 206 fetches only a first range of one segment over the potential data bearer, and if so a second range of the same segment may be fetched over a non-potential data bearer. Then, the device proxy 206 is able to join the fetched first and second ranges of the segment to form a complete segment before delivery to the media player 208.

In another example embodiment, the device proxy 206 may fetch non-time critical segments of the content data over the potential data bearer using a first connection, while time critical segments of the content data are fetched over a non-potential data bearer using a second connection. In this case, another example embodiment may be that the time critical segments are fetched from a first content server of the data source using the first connection, while the non-time critical segments are fetched from a second content server of the data source using the second connection, wherein the second content server is capable of potential data class delivery. Some examples of how this embodiment could be employed will be described in more detail later below with reference to FIGS. 4 and 5.

In another example embodiment, the non-time critical segments could in the above case be fetched from the second content server after being redirected by the first content server. For example, the device proxy 206 may initially send Get requests to the first content server. In case the potential data bearer becomes available, the first content server may redirect the device proxy 206 to the second content server if the first content server is unable to indicate the data as belonging to the potential data class.

In another example embodiment, the device proxy 206 may fetch non-time critical segments of the content data from the data source over the potential data bearer using a first stream or stream class of a connection, while time critical segments of the content data from the data source are fetched over a non-potential data bearer using a second stream or stream class of the same connection. The data communication may in this way be separated into one stream or stream class for non-time critical segments and another stream or stream class for time critical segments of the data.

For example, there are protocols that associate each new request/response pair with new streams, and in this case two classes of streams may be defined that are easily distinguishable by their types or stream identifiers. An illustrative but non-limiting example is to map non-potential data requests to streams with odd-numbered identifiers and potential to streams with even-numbered identifiers, which thus represent two stream classes.

It was mentioned above that data requests may be sent to the data source with a query parameter indicating that requested content data can be classified as potential data class. In another example embodiment, the above non-time critical segments may be fetched by sending a Get request extended with such a query parameter indicating that the non-time critical segments should be marked by the data source 204 as belonging to the potential data class.

In further example embodiments, the device proxy may reside in the wireless device or in a home gateway, which has also been described above.

An example of how a device proxy may operate in more detail will now be described referring to the flow chart in FIG. 4, again with further reference to FIG. 2 but without limitation to the communication scenario therein. The situation in this example is basically the same as in FIG. 3, assuming that the device proxy 206 has previously received at least one request from the media player 208 for a data segment of some desired video content, and that the device proxy 206 will fetch data segments from the data source 204, either proactively or in response to a request from the media player 208.

Figure 4:
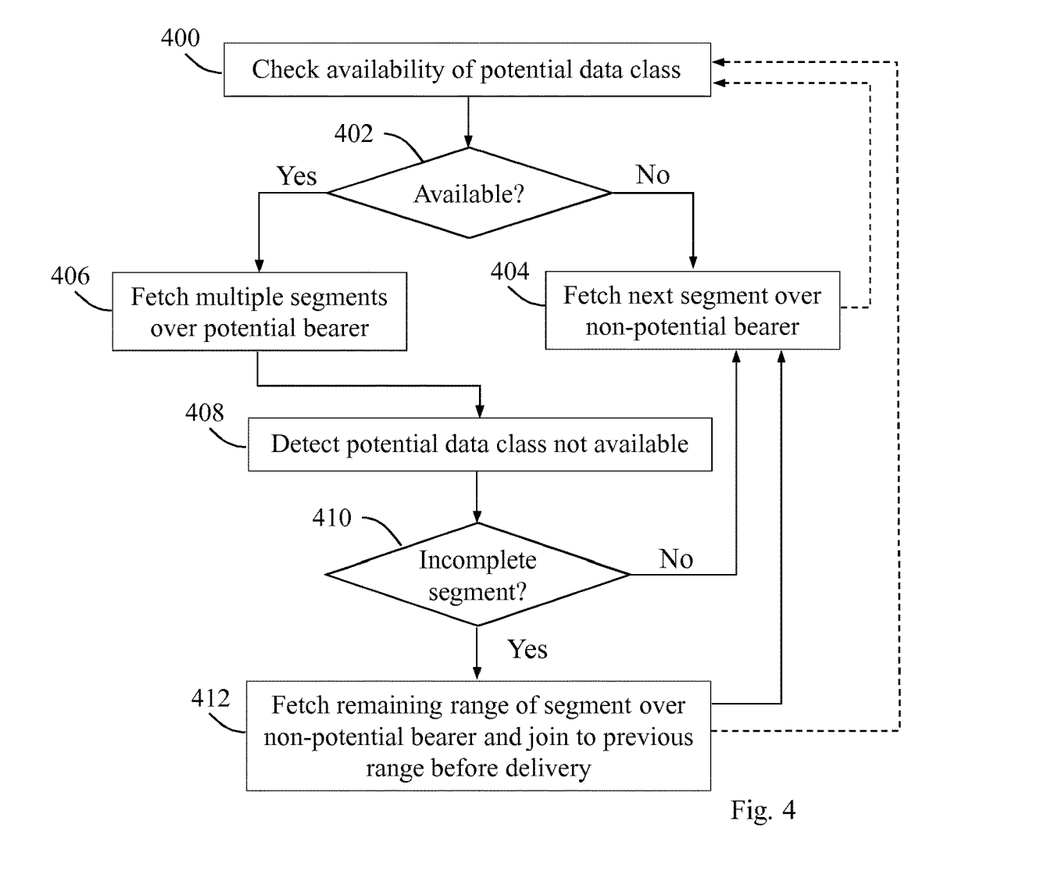
FIG. 4 is a flow chart illustrating an example of how a device proxy may operate in more detail, according to further example embodiments.

A first action 400 illustrates that the device proxy 206 checks availability of the potential data class, e.g. by obtaining an availability indicator signalled from the network as described above. The device proxy 206 further determines whether the potential data class is available to the device proxy 206 on behalf of the wireless device 200 or not in an action 402. If not available, the device proxy 206 may fetch a next data segment over a non-potential data bearer, if needed, in an action 404. Alternatively, the device proxy 206 may wait until the potential data class becomes available before fetching the next data segment if the resulting delay can be tolerated.

If the potential data class is found to be available in action 402, the device proxy 206 proactively fetches multiple data segments over the potential data bearer, in an action 406, which are stored in the intermediate buffer 206A for future delivery when requested by the media player 208. In this example, data segments are fetched over the potential data bearer in action 406 until the device proxy 206 detects that the potential data class is no longer available in an action 408.

It is then checked in an action 410 whether the latest fetched data segment was incomplete such that the device proxy 206 was able to fetch only a range of the latest data segment, corresponding to the above-mentioned first range of a segment. If the latest data segment was fetched complete, the device proxy 206 may fetch a next data segment over the non-potential data bearer, if needed, by returning to action 404. On the other hand, if the latest data segment was found incomplete in action 410, the device proxy 206 will fetch a remaining range of that segment, corresponding to the above-mentioned second range of the segment, over the non-potential data bearer and join the latter range to the previously fetched range before delivery, in a final shown action 412.

Some further examples of how content data can be downloaded to a wireless device in a wireless network by means of a device proxy will now be described, using the same reference numerals as above for the device proxy 206 and the data source 204, while numeral 202 schematically indicates the wireless network. Firstly, an example of how content data can be downloaded to a wireless device over two connections will be described with reference to the communication scenario in FIG. 5. In this example, the data source 204 comprises a first content server 204A which is not capable of potential data class delivery and a second content server 204B which is capable of potential data class delivery. The dual connections in this example may include QUIC (Quick UDP Internet Connection) and TCP (Transmission Control Protocol) connections.

Figure 5:
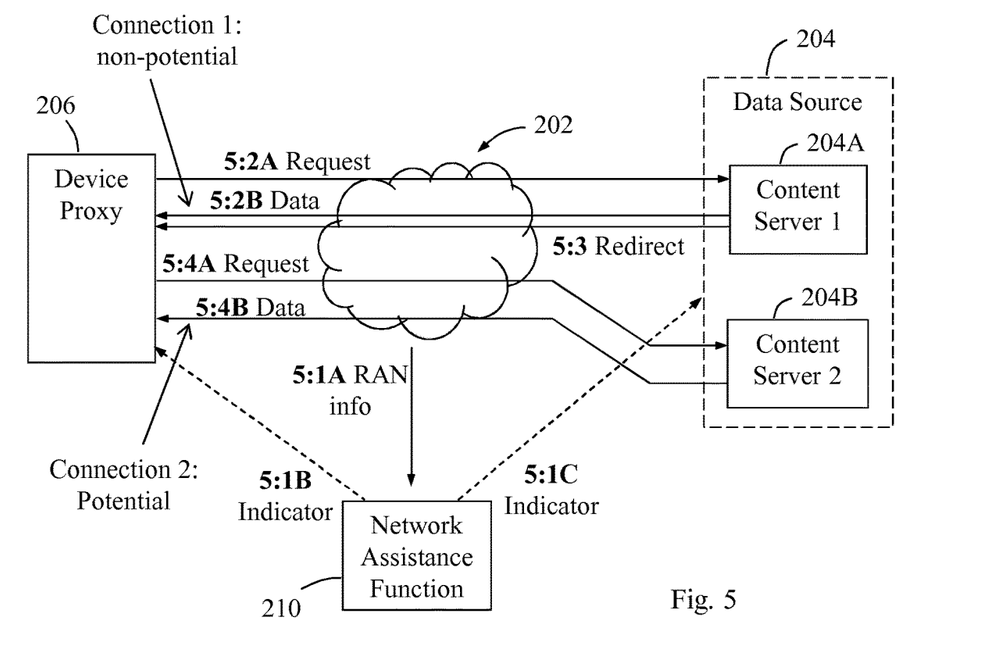
FIG. 5 is a communication scenario illustrating an example of how content data can be downloaded to a wireless device over two connections, according to further example embodiments.

A network assistance function 210 is also shown that obtains information about availability of the potential data bearer, denoted "RAN info", from the network 202 in an action 5:1A. The network assistance function 210 further sends an availability indicator accordingly to the device proxy 206 in action 5:1B and to the first content server 204A in action 5:1C. Thereby, the device proxy 206 can send data requests with the above-described query parameter and the first content server 204A can redirect the device proxy 206 to the second content server 204B for utilizing the potential data class. The network assistance function 210 is shown to represent any node associated with the wireless network, which node is capable of providing the availability indicator, which could be sent over a serving network node to the device proxy 206 and over a suitable gateway of the network 202 to the first content server 204A.

In this example, the device proxy 206 fetches time critical data segments from the first content server 204A using a first connection for a non-potential data bearer, as shown in actions 5:2A and 5:2B, respectively. If the first content server 204A redirects the device proxy 206 to the second content server 204B, in an action 5:3, in response to a request for a non-time critical segment, the device proxy 206 will fetch one or more non-time critical segments from the second content server 204B using a second connection for a potential data bearer, as shown in actions 5:4A and 5:4B, respectively.

In the above example of using two separate connections, some further aspects are as follows. The above-mentioned query parameter may be realized by a packet marking called Differentiated Services Code Point, DSCP. Instead of using DSCP packet marking, it is possible to use specific IP-port pairs as indicators whether flows should be treated as potential data class or not.

If the first content server 204A receives an indication of available potential data, it will respond to the next incoming request from the device proxy with a redirection towards the second content server 204B which is capable of enabling potential data class delivery. If the device proxy 206 is notified that the potential data class is available, as of action 5:1B, it will either make a request to a server it knows is associated with potential data, or if no such server is known it will request content from the already resolved content server and append a query parameter to the request indicating the desire to fetch content data on the potential data bearer. The first content server 204A will respond with a redirect message pointing to the second content server 204B associated with potential data delivery. When the potential data class is no longer available, the second connection can be torn down.

Figure 6:
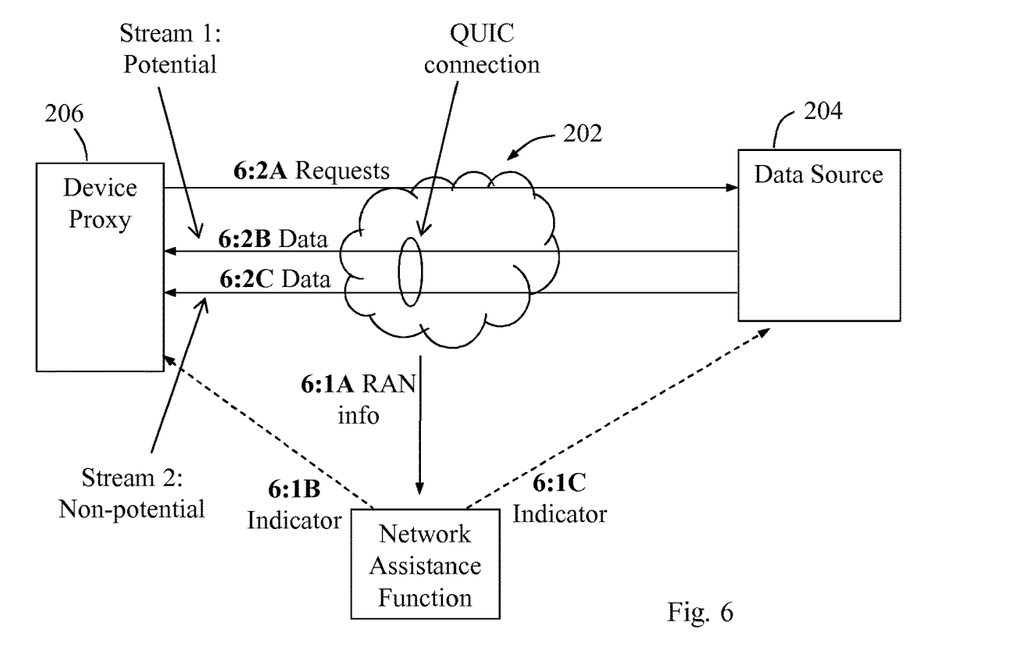
FIG. 6 is a communication scenario illustrating another example of how content data can be downloaded to a wireless device over two streams of a single connection, according to further example embodiments.

Secondly, an example of how content data can be downloaded to a wireless device over two separate streams of a single connection will be described with reference to the communication scenario in FIG. 6. In this example, the data source 204 is capable of potential data class delivery. Similar to FIG. 5, the network assistance function 210 obtains availability information from the network 202 in an action 6:1A and sends an availability indicator to the device proxy 206 in action 6:1B and to the data source 204 in action 6:1C. Thereby, the device proxy 206 can send data requests with the above-described query parameter and the data source 204 can send data segments marked with the potential data class.

When the device proxy 206 sends data requests to the data source 204, illustrated by action 6:2A, the data source 204 sends non-time critical segments of the content data marked with the potential data class so that these segments are transmitted over the potential data bearer using a first stream of a connection, illustrated by action 6:2B. The data source 204 further sends time critical segments of the content data marked with a non-potential data class so that the latter segments are transmitted over a non-potential data bearer using a second stream of the same connection, illustrated by action 6:2C.

In the latter example of using two separate streams of the same connection, some further aspects are as follows. A single QUIC connection may be used to transmit video data such that potential data is separated from non-potential data by use of different QUIC streams.

Datagrams that carry stream packets containing potential data may be marked in an IP header, e.g. using a so-called Type-of-Service, ToS, field. This information can be used by a packet core of the wireless network to map packets to the correct data bearer. In this context, a segment is a multimedia data file that is divided by the transport layer into transport packets, each carried by a so-called IP packet.

The device proxy may indicate that data should be treated as potential by appending the above-described query parameter to the data request, or by assigning a stream identification number of a specific format when creating the stream.

Differentiation of potential data class on the QUIC connection may be done with one of the following alternatives, referred to as "URL differentiation" and "Stream number differentiation".

URL Differentiation
1. The device proxy receives notification of availability of potential data.
2. The device proxy establishes a new stream towards the data source and sends a HTTP GET request for desired content. The Unified Resource Locator, URL, used in the request is extended with a query parameter indicating that the requested data should be treated as potential.
3. The data source receives the HTTP GET request and determines that the requested data should be delivered as potential data. For example, when writing data to socket, a HTTP server can use an API call that indicates to a network stack that the data belongs to the potential data class.
4. The network stack in the data source marks IP datagrams with the potential data class before transmission.

Stream Number Differentiation
1. The endpoint that receives an indication of availability of the potential data class sets up a QUIC stream with a stream identification, ID, that follows a specific predefined pattern. The stream ID pattern is constructed in such a way that a function that takes the ID as its argument will return true or false. A simple example of such a function is a test whether the stream ID is a multiple of a specific start number. The start numbers can be different at the device proxy and the data source which can be agreed upon during connection setup.
2. The network stack in the data source will mark IP datagrams belonging to a potential stream before transmission.

When either endpoint receives an indication that sending potential data is no-longer possible, it should tear down any active streams that carry potential data.

If the potential data becomes unavailable while downloading a video segment, the partial segment is stored at the device proxy, as described above. The remainder of that segment can then be fetched as non-potential data by use of an HTTP range-request.

Figure 7:
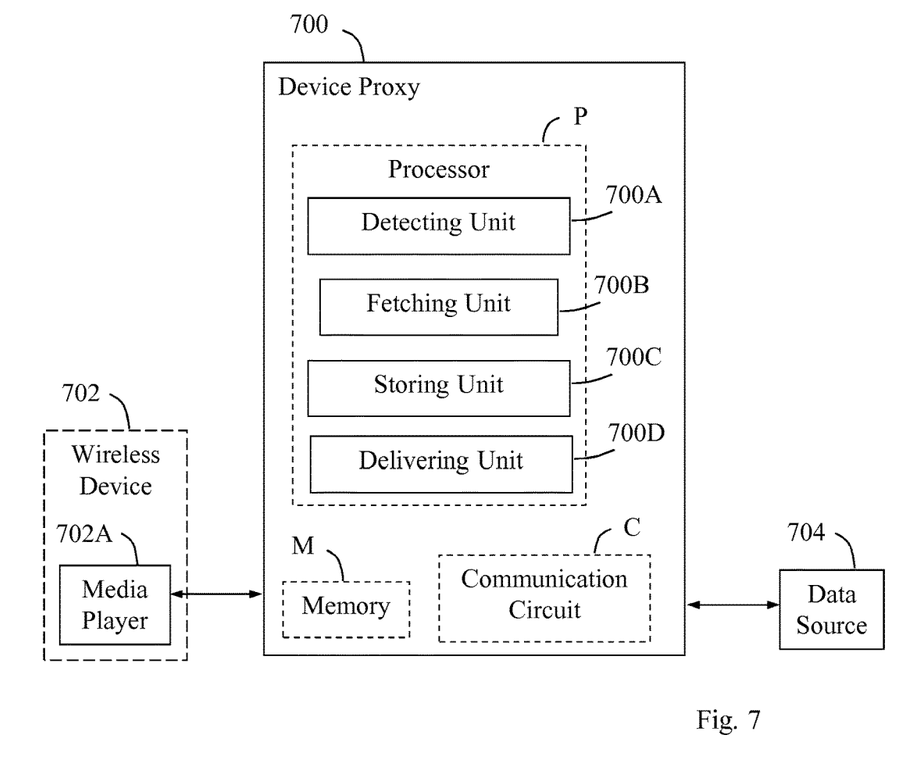
FIG. 7 is a block diagram illustrating how a device proxy may be structured, according to further example embodiments.

The block diagram in FIG. 7 illustrates a detailed but non-limiting example of how a device proxy 700 may be structured to bring about the above-described solution and embodiments thereof. The device proxy 700 may be configured to operate according to any of the examples and embodiments for employing the solution as described herein, where appropriate and as follows. The device proxy 700 is shown to comprise a processor P and a memory M, said memory comprising instructions executable by said processor whereby the device proxy 700 is operable as described herein. The device proxy 700 also comprises a communication circuit C with suitable equipment for sending and receiving data and messages in the manner described herein.

The communication circuit C is configured for communication with a media player 702A of a wireless device 702 and with a data source 704 over a wireless network using suitable protocols and interfaces depending on how the participating nodes are operating. Such communication may be performed over any suitable interfaces and nodes depending on the implementation, which is not necessary to describe here as such in any detail. The solution and embodiments herein are thus not limited to using any specific types of networks, technology or protocols for communication. As also indicated above, the device proxy 700 may be configured to reside in the wireless device 702 itself or in a home gateway that communicates wirelessly with the wireless device 702.

The device proxy 700 comprises means configured or arranged to basically perform the actions in FIG. 3 and at least some of the actions in FIG. 4, and more or less in the manner described above for the device proxy 206 in various examples. The device proxy 700 is arranged or configured to be associated with a wireless device 702 in a wireless network, and to handle radio communication of content data from a data source 704 to be played out on a media player 702A of the wireless device.

The device proxy 700 is configured to detect that a potential data class is available for radio communication to the device proxy 700 on behalf of the wireless device, the potential data class indicating that a certain delay for delivering data can be tolerated. This detecting operation may be performed by a detecting unit 700A in the device proxy 700, e.g. in the manner described above for action 300. The detecting unit 700A could alternatively be named a monitoring unit or determining unit.

The device proxy 700 is further configured to fetch segments of the content data from the data source over a potential data bearer dedicated for data of said potential data class. This operation may be performed by a fetching unit 700B in the device proxy 700, e.g. as described above for action 302. The fetching unit 700B could alternatively be named a retrieving unit or downloading unit.

The device proxy 700 is also configured to store the fetched segments of content data in an intermediate buffer. This operation may be performed by a storing unit 700C in the device proxy 700, e.g. as described above for action 304. The storing unit 700C could alternatively be named a buffering unit or saving unit.

The device proxy 700 is further configured to deliver the segments of content data from the intermediate buffer when requested by the media player. This operation may be performed by a delivering unit 700D in the device proxy 700, e.g. as described above for action 306. The delivering unit 700D could alternatively be named a sending unit or providing unit.

It should be noted that FIG. 7 illustrates various functional units or modules in the device proxy 700, and the skilled person is able to implement these functional modules or in practice using suitable software and hardware. Thus, the solution is generally not limited to the shown structures of the device proxy 700, and the functional units or modules 700A-D therein may be configured to operate according to any of the features and embodiments described in this disclosure, where appropriate.

Figure 7A:
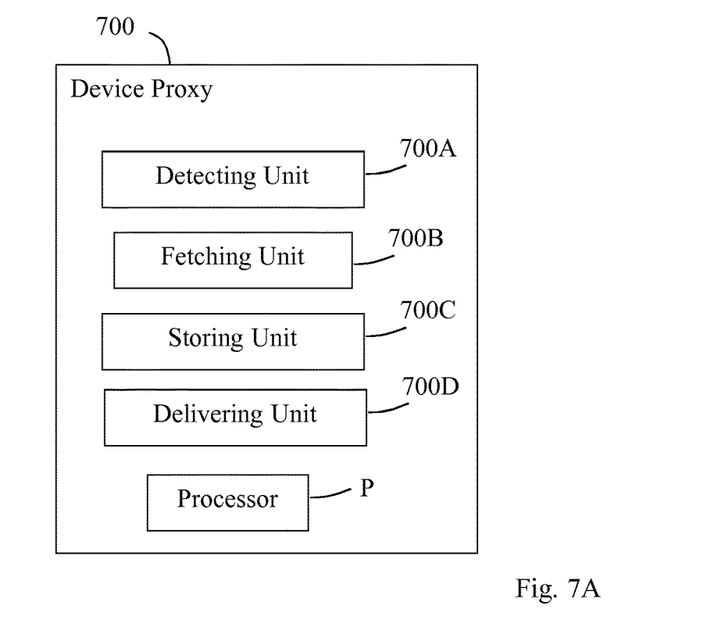

Another example of how the device proxy 700 may be configured is schematically shown in the block diagram of FIG. 7A. In this example, the device proxy 700 comprises the above-described functional modules 700A-D and a processor P, the modules 700A-D being configured to operate in the manner described above as controlled by the processor P.

The functional modules or units 700A-D described above can be implemented in the device proxy 700 by means of suitable hardware and program modules of a computer program comprising code means which, when run by the processor P causes the device proxy 700 to perform at least some of the above-described actions and procedures. The functional modules or units 700A-D may alternatively be referred to as circuits, thus including a detecting circuit 700A, a fetching circuit 700B, a storing circuit 700C and a delivering circuit 700D.

In either of FIG. 7 and FIG. 7A, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the device proxy 700 in the form of a memory having a computer readable medium and being connected to the processor P. The computer program product or memory in the device proxy 700 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the device proxy 700.

The solution described herein may thus be implemented in the device proxy 700 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

Figure 8:
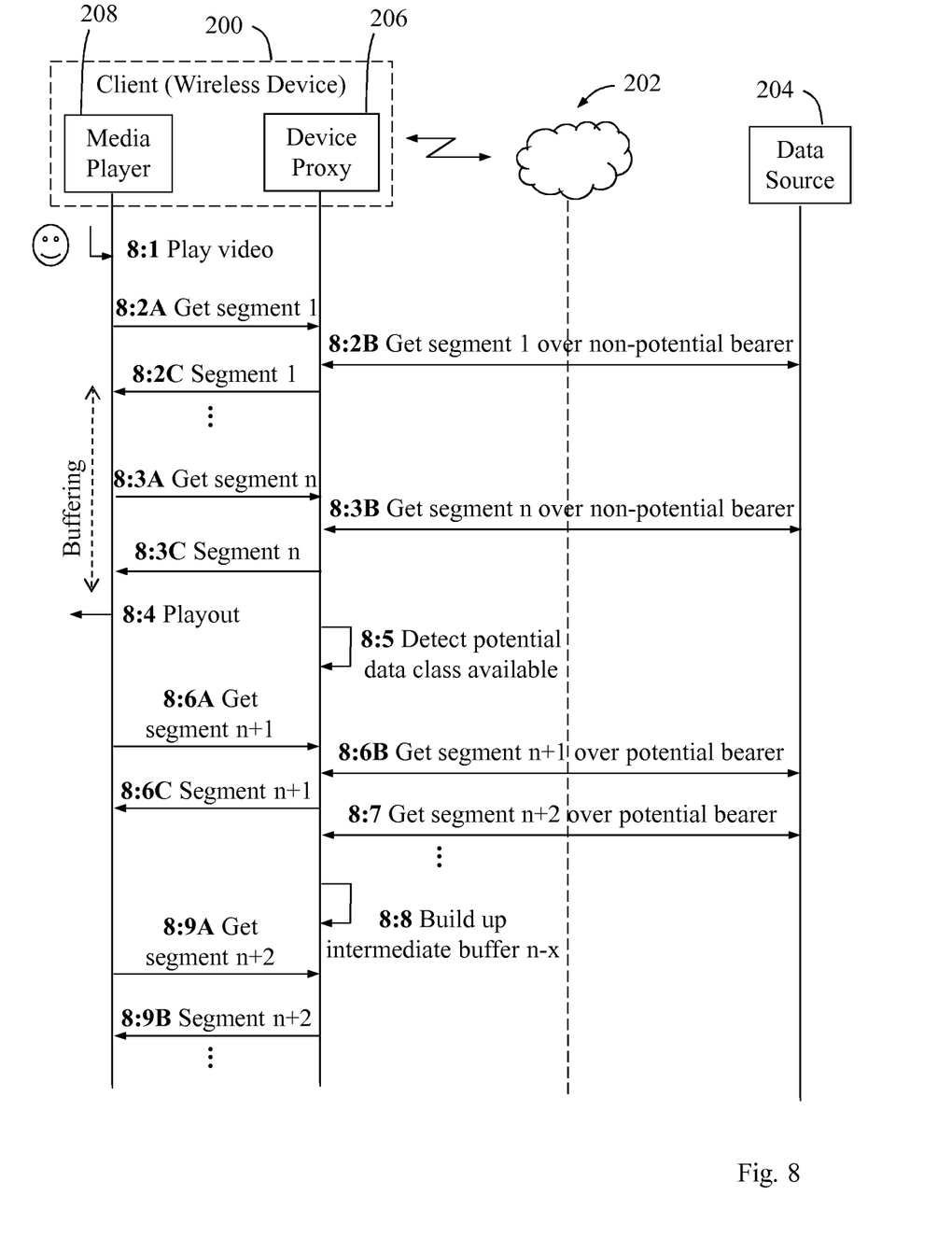
FIG. 8 is a signaling diagram illustrating another example where a device proxy is employed for handling radio communication of content data, according to further example embodiments.

Another example of how the above-described solution and embodiments may be employed in practice will now be described with reference to the signaling diagram in FIG. 8, where the same numerals as in previous figures are once again used. In this example, the device proxy 206 is integrated and resides in the wireless device 200 which can be seen as the "client side" of the procedure. The actions in this procedure are briefly described below.

Action 8:1

A user activates the media player 208 to play a selected video.

Action 8:2A

The media player 208 sends a Get request for a first segment of the video addressed to the data source 204 and the request arrives at the device proxy 206.

Action 8:2B

The device proxy 206 fetches the first segment from the data source 204 over the non-potential data bearer.

Action 8:2C

The device proxy 206 delivers the requested first segment to the media player 208 which is stored in its playout buffer 208A. Actions 8:2A-C are repeated for a number of segments while the media player 208 buffers the delivered segments before playout, as indicated by a vertical dashed arrow.

Action 8:3A

The media player 208 sends a Get request for another segment n of the video to the device proxy 206.

Action 8:3B

The device proxy 206 fetches segment n from the data source 204 over the non-potential data bearer.

Action 8:3C

The device proxy 206 delivers the requested segment n to the media player 208 which is stored in its playout buffer.

Action 8:4

After receiving the 1-n segments, the playout buffer 208A has been built up so that the media player 208 can start to playout the segments.

Action 8:5

The device proxy 206 detects that the potential data class has become available.

Action 8:6A

The media player 208 sends a Get request for segment n+1 of the video to the device proxy 206.

Action 8:6B

The device proxy 206 fetches segment n+1 from the data source 200 over the potential data bearer.

Action 8:6C

The device proxy 206 delivers the requested segment n+1 to the media player 208.

Action 8:7

The device proxy 206 continues to proactively fetch further segments, n+2 and so forth, from the data source 204 over the potential data bearer without receiving any further request from the media player 208.

Action 8:8

The device proxy 206 builds up its intermediate buffer 206A with a number of fetched segments n+x.

Action 8:9A

The media player 208 sends a Get request for segment n+2 of the video to the device proxy 206, which segment has already been fetched from the data source 204 in action 8:6B.

Action 8:9B

The device proxy 206 delivers segment n+2 to the media player 208.

While the solution has been described with reference to specific exemplifying embodiments, the description is generally only intended to illustrate the inventive concept and should not be taken as limiting the scope of the solution. For example, the terms "device proxy", "wireless device", "data source", "content server", "potential data class" and "non-potential data class" have been used throughout this disclosure, although any other corresponding entities, functions, and/or parameters could also be used having the features and characteristics described here. The solution is defined by the appended claims.

The invention claimed is:

1. A method performed by a device proxy associated with a wireless device in a wireless network, for handling radio communication of content data from a data source to be played out on a media player of the wireless device, the method comprising:
  detecting that content data of a potential data class is available for radio communication to the device proxy from said data source on behalf of the wireless device, wherein:
    the data of the potential data class comprises non-time critical data that indicates that a certain delay for delivering data of said potential data class is tolerated,
    the data of a non-potential data class comprises time critical data that indicates that the certain delay for delivering data is not tolerated,
    the non-time critical data of the potential data class is fetched over a potential data bearer, and
    the time critical data of the non-potential data class is fetched over a non-potential data bearer,
  fetching segments of the content data from the data source over the potential data bearer dedicated for data of said potential data class, wherein further segments of the content data are fetched over the potential data bearer until the content data of the potential data class becomes unavailable, until all accessible segments have been fetched, or until an intermediate buffer is full, wherein, if only a first range of one segment is fetched over the potential data bearer, a second range of the same segment is fetched over the non-potential data bearer and the first and second ranges of the segment are joined by the device proxy to form a complete segment before delivery to the media player,
  storing the fetched segments of content data in the intermediate buffer, and
  delivering the segments of content data from the intermediate buffer when requested by the media player.

2. The method according to claim 1, wherein fetching segments of the content data from the data source over the potential data bearer includes sending data requests to the data source with a query parameter indicating that requested content data be classified as of the potential data class.

3. The method according to claim 1, wherein the non-time critical data is fetched over the potential data bearer using a first connection, while the time critical data is fetched over the non-potential data bearer using a second connection.

4. The method according to claim 3, wherein the time critical data is fetched from a first content server of the data source using the first connection, while the non-time critical data is fetched from a second content server of the data source using the second connection, wherein the second content server is capable of potential data class delivery.

5. The method according to claim 4, wherein the non-time critical data is fetched from the second content server after being redirected by the first content server.

6. The method according to claim 1, wherein the non-time critical data from the data source is fetched over the potential data bearer using a first stream or stream class of a connection, while the time critical data from the data source is fetched over the non-potential data bearer using a second stream or stream class of the same connection.

7. The method according to claim 1, wherein the non-time critical data is fetched by sending a Get request extended with a query parameter indicating that the non-time critical data should be marked by the data source as belonging to the potential data class.

8. The method according to claim 1, wherein the device proxy resides in the wireless device or in a home gateway.

9. A device proxy associated with a wireless device in a wireless network and arranged to handle radio communication of content data from a data source to be played out on a media player of the wireless device, the device proxy comprising:
  processing circuitry configured to cause the device proxy to:
    detect that content data of a potential data class is available for radio communication to the device proxy from said data source on behalf of the wireless device, wherein:
      the data of the potential data class comprises non-time critical data that indicates that a certain delay for delivering data of said potential data class is tolerated,
      the data of a non-potential data class comprises time critical data that indicates that the certain delay for delivering data is not tolerated,
      the non-time critical data of the potential data class is fetched over a potential data bearer, and
      the time critical data of the non-potential data class is fetched over a non-potential data bearer,
    fetch segments of the content data from the data source over a potential data bearer dedicated for data of said potential data class, wherein further segments of the content data are fetched over the potential data bearer until the content data of the potential data class becomes unavailable, until all accessible segments have been fetched, or until an intermediate buffer is full, wherein, if only a first range of one segment is fetched over the potential data bearer, a second range of the same segment is fetched over a non-potential data bearer and the first and second ranges of the segment are joined by the device proxy to form a complete segment before delivery to the media player,
    store the fetched segments of content data in the intermediate buffer, and
    deliver the segments of content data from the intermediate buffer when requested by the media player.

10. The device proxy according to claim 9, wherein the device proxy is configured to fetch segments of the content data from the data source over the potential data bearer by sending data requests to the data source with a query parameter indicating that requested content data be classified as of the potential data class.

11. The device proxy according to claim 9, wherein the device proxy is configured to fetch the non-time critical data over the potential data bearer using a first connection, and to fetch the time critical data over the non-potential data bearer using a second connection.

12. The device proxy according to claim 11, wherein the device proxy is configured to fetch the time critical data from a first content server of the data source using the first connection, and to fetch the non-time critical data from a second content server of the data source using the second connection, wherein the second content server is capable of potential data class delivery.

13. The device proxy according to claim 12, wherein the device proxy is configured to fetch the non-time critical data from the second content server after being redirected by the first content server.

14. The device proxy according to claim 11, wherein the device proxy is configured to fetch the non-time critical data by sending a Get request extended with a query parameter indicating that the non-time critical data should be marked by the data source as belonging to the potential data class.

15. The device proxy according to claim 9, wherein the device proxy is configured to fetch the non-time critical data from the data source over the potential data bearer using a first stream or stream class of a connection, and to fetch the time critical data from the data source over the non-potential data bearer using a second stream or stream class of the same connection.

16. The device proxy according to claim 9, wherein the device proxy is configured to reside in the wireless device or in a home gateway.

17. A non-transitory computer-readable storage medium comprising a computer program product including instructions to cause at least one processor to:
  detect that content data of a potential data class is available for radio communication to the device proxy from said data source on behalf of the wireless device, wherein:
    the data of the potential data class comprises non-time critical data that indicates that a certain delay for delivering data of said potential data class is tolerated,
    the data of a non-potential data class comprises time critical data that indicates that the certain delay for delivering data is not tolerated,
    the non-time critical data of the potential data class is fetched over a potential data bearer, and
    the time critical data of the non-potential data class is fetched over a non-potential data bearer,
  fetch segments of the content data from the data source over a potential data bearer dedicated for data of said potential data class, wherein further segments of the content data are fetched over the potential data bearer until the content data of the potential data class becomes unavailable, until all accessible segments have been fetched, or until an intermediate buffer is full, wherein, if only a first range of one segment is fetched over the potential data bearer, a second range of the same segment is fetched over a non-potential data bearer and the first and second ranges of the segment are joined by the device proxy to form a complete segment before delivery to the media player,
  store the fetched segments of content data in the intermediate buffer, and
  deliver the segments of content data from the intermediate buffer when requested by a media player, which play out the content data.

* * * * *